Dec. 25, 1928.

L. A. WHITE 1,696,512

INDICATING MECHANISM

Filed Dec. 20, 1924     4 Sheets-Sheet 1

Inventor:
Louis A. White
Witness:
James Hutchinson
By Milans & Milans
Attorneys

Dec. 25, 1928.  1,696,512
L. A. WHITE
INDICATING MECHANISM
Filed Dec. 20, 1924   4 Sheets-Sheet 2
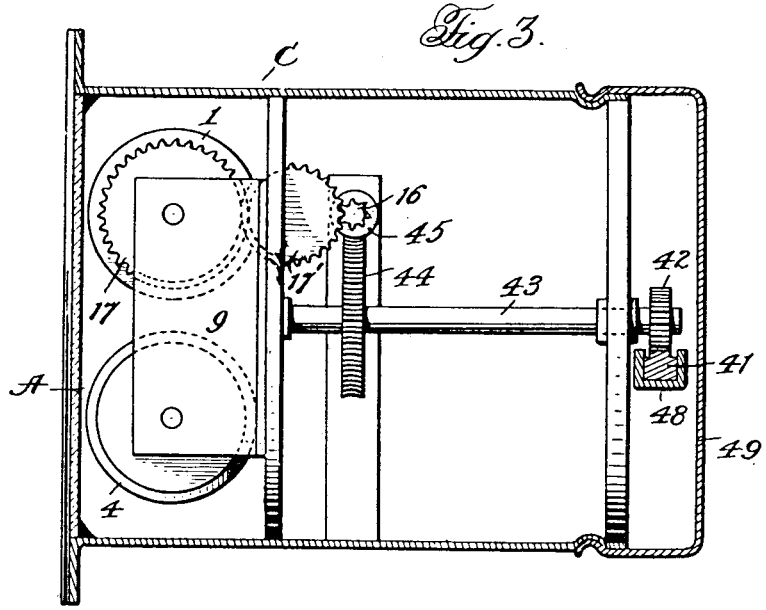
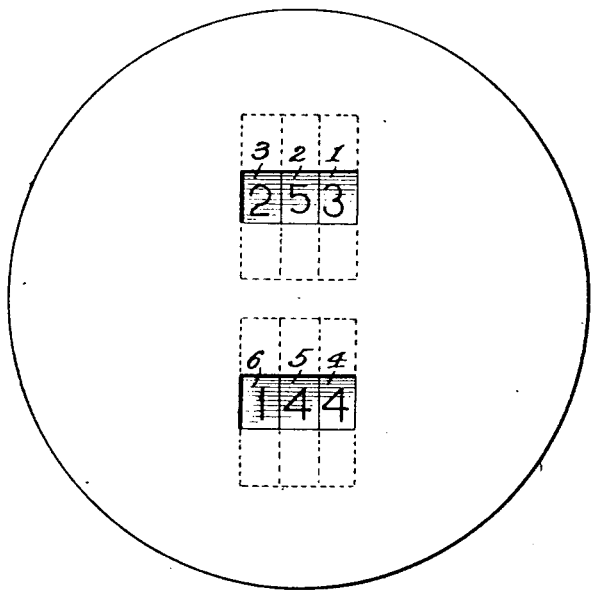
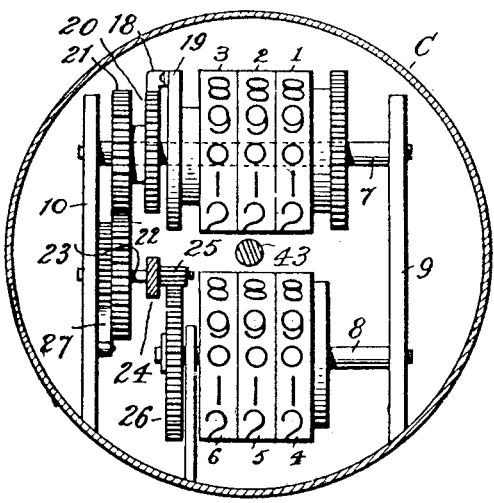
Inventor:
Louis A. White,
By Milans & Milans
Attorneys.
Witness:
Jas. E. Hutchinson.

Dec. 25, 1928.  1,696,512
L. A. WHITE
INDICATING MECHANISM
Filed Dec. 20, 1924  4 Sheets-Sheet 3

Inventor:
Louis A. White,

Witness:
James Hutchinson.

By Milans & Milans
Attorneys

Dec. 25, 1928. 1,696,512

L. A. WHITE

INDICATING MECHANISM

Filed Dec. 20, 1924  4 Sheets-Sheet 4

Inventor:
Louis A. White,
By Milans & Milans
Attorneys

Witness:
Jas. E. Hutchinson

Patented Dec. 25, 1928.

1,696,512

UNITED STATES PATENT OFFICE.

LOUIS A. WHITE, OF BROOKLYN, NEW YORK.

INDICATING MECHANISM.

Application filed December 20, 1924. Serial No. 757,276.

This invention relates to improvements in indicator mechanism for automobile fuel tanks and the like for indicating the amount of fuel in the tank and the amount of fuel consumed, and providing for the operation of an indicator at a distance from the tank.

The object of the invention is to provide improved mechanism of the character referred to, of simple compact construction capable of being readily applied to the various makes of motor vehicles and that will be reliable and efficient in use.

The invention, with other objects and advantages thereof, and the particular construction, combinations, and arrangements of parts comprising the same, will be understood from the hereinafter contained detail description, when considered in connection with the accompanying drawings, forming part hereof and illustrating one embodiment of the invention.

Fig. 3 is a longitudinal section through the indicator mechanism casing, parts of the mechanism being shown in end elevation.

Fig. 4 is a front elevation of the indicator mechanism.

Fig. 5 is a front elevation of the indicating mechanism, with the front plate of the casing removed.

Figure 6:
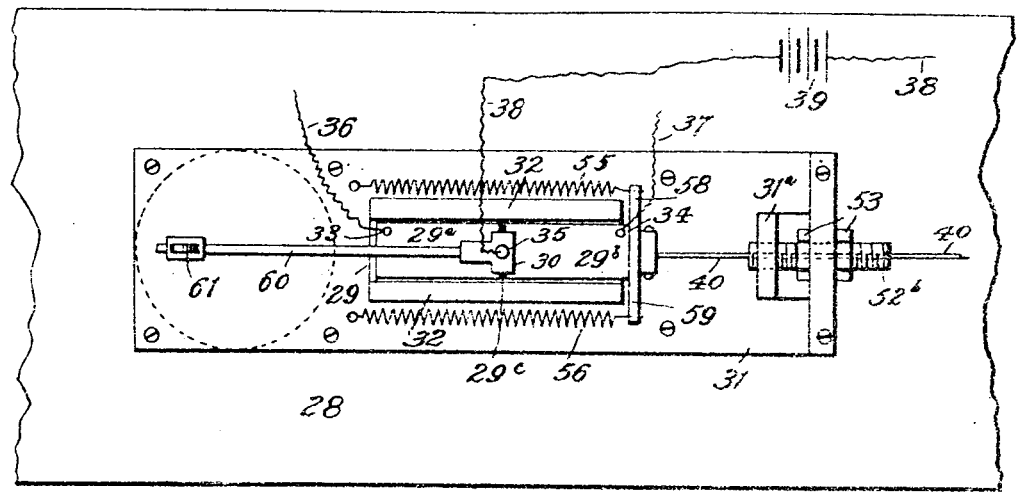

Fig. 6 is a detail top plan view, on an enlarged scale, of the switch mechanism and float control.

Figures 7, 10:
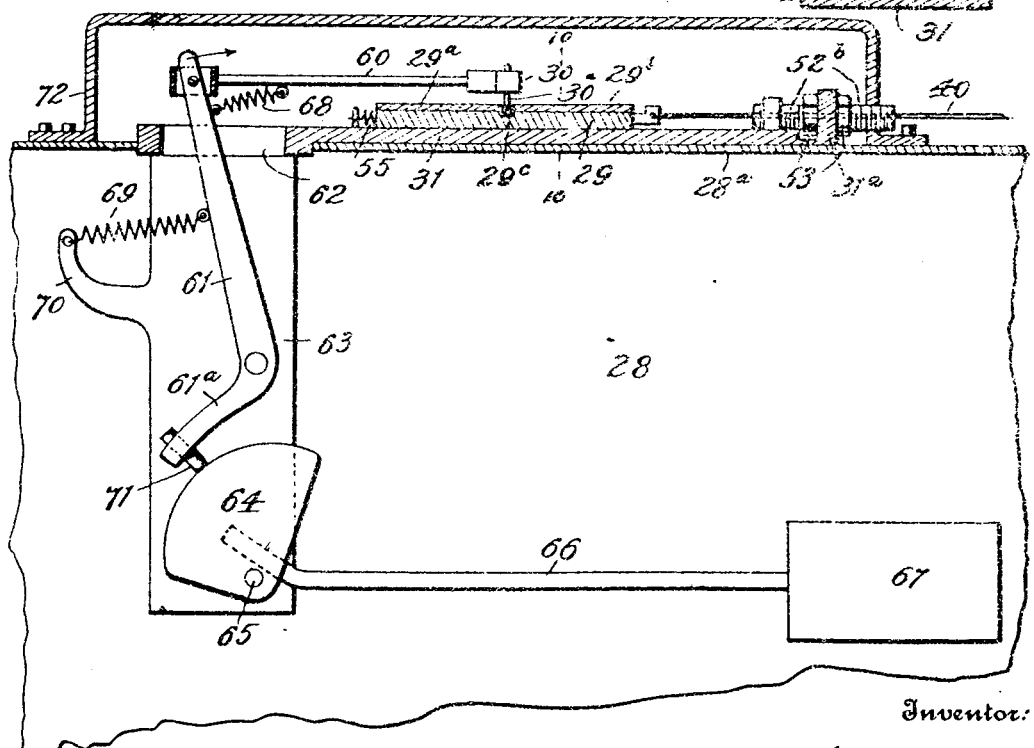

Fig. 7 is a part side elevation and part section of the switch mechanism and float control.

Figure 8:
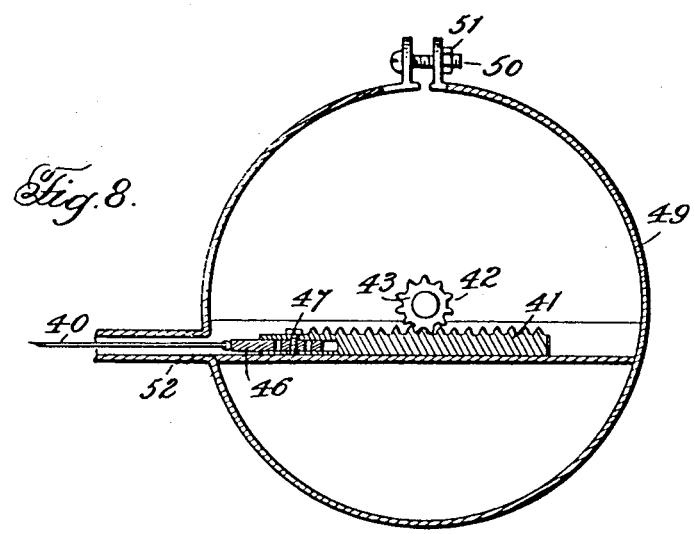

Fig. 8 is a detail section, on an enlarged scale, of the auxiliary casing part and the rack and gear connection.

Figure 9:
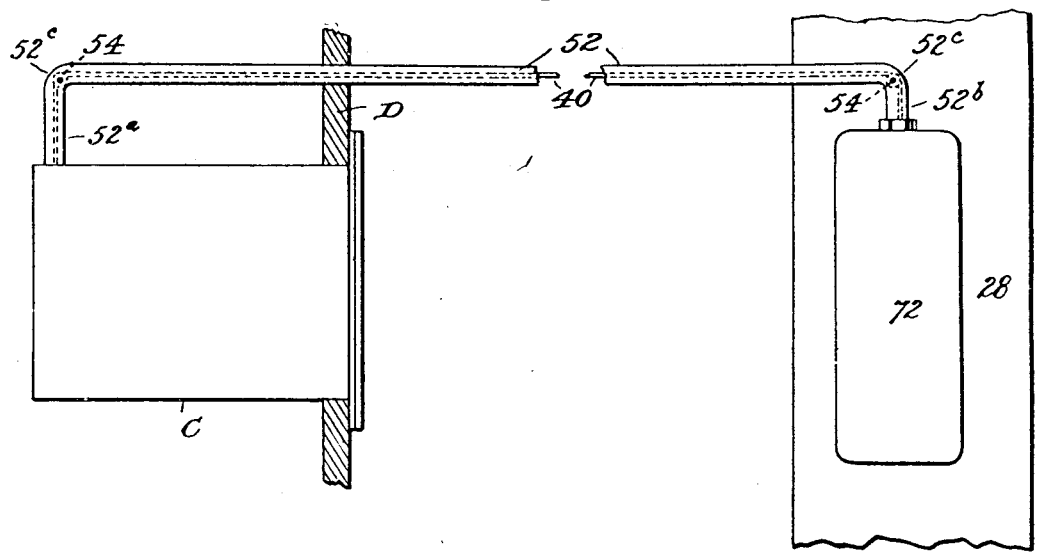

Fig. 9 is a top plan view of the mechanism.

Fig. 10 is a section on the line 10—10 of Figure 7.

Figure 2:
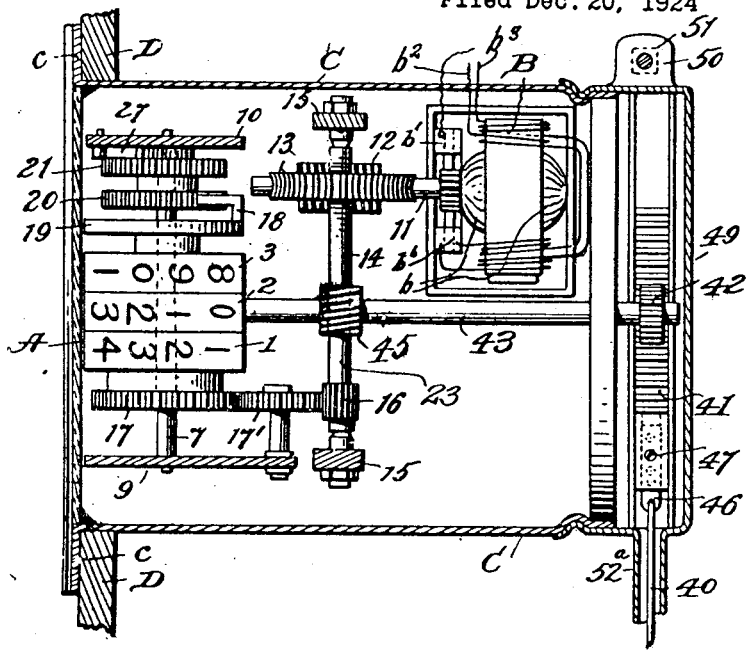
Fig. 2 is a top plan view of the indicator mechanism, motor, and rack and gear connection directly associated therewith.
Figure 1:
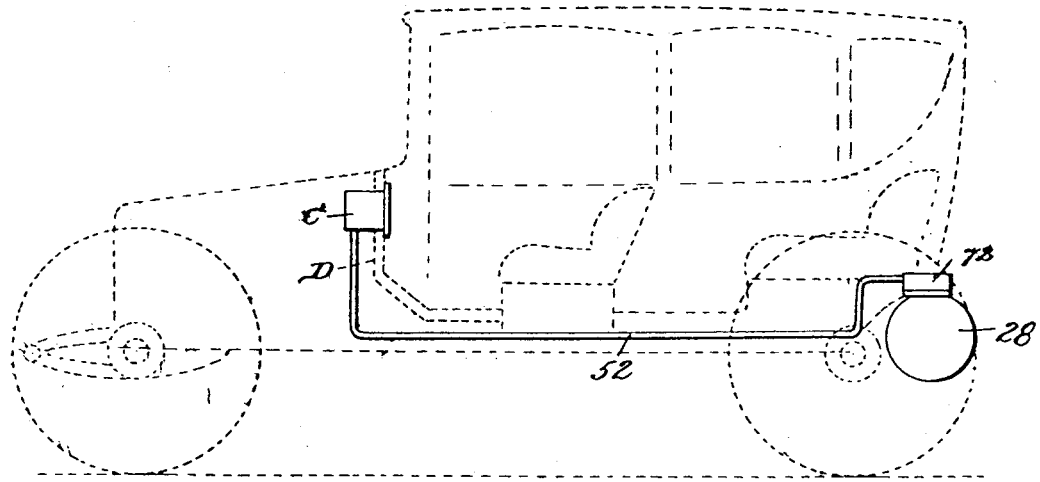
Figure 1 is a diagrammatic view illustrating the application of indicating mechanism
25 constructed in accordance with the present invention applied to a motor vehicle.

The invention comprehends improved indicator mechanism including a float in the fuel tank, an indicator device rotatable in opposite directions for indicating the amount of liquid fuel in the tank and adapted to be located at a distant point therefrom on the vehicle instrument board, a reversible rotary electric motor for operating the indicator, and automatic switch mechanism connected and controlled by the movement of the float in the tank for reversing and controlling the operation of the electric motor to actuate the indicator in accordance with the amount of liquid fuel supplied to the tank and its consumption or passage therefrom. More particularly the invention contemplates improved switch mechanism including cooperating relatively movable switch members connected respectively to the float and motor to be actuated thereby, one of the switch members comprising separate contact plates electrically connected with different windings of the motor and the other switch member comprising a brush connected appropriately in the circuit and adapted to engage said contact plates. The invention further contemplates means for indicating or registering the total amount of liquid fuel consumed in combination with the indicating means for indicating the amount of liquid fuel in the tank.
While a specific embodiment of the invention is illustrated in the drawings, it will of course be understood that changes and obvious modifications of the particular construction shown, and the embodiment of the invention in other forms, as will appeal to those skilled in the art and falling within the scope of the appended claims may be practiced without departing from the spirit of the invention.
Referring to a detail description of the particular embodiment of the invention illustrated in the drawings, A designates the indicator device and B the reversible rotary electric motor for operating the same, both the indicator device A and the motor B being arranged within a casing C and mounted upon the instrument board D of a motor vehicle (see particularly Figures 1, 2 and 3), the casing C being shown fitting into an opening in the instrument board D and having a flange c secured thereto.

The indicator device is shown in the present instance as comprising an upper series and a lower series of numeral wheels 1, 2, 3 and 4, 5, 6, the upper series of wheels 1, 2, 3, being adapted to indicate in tenths of gallons, gallons, and tens of gallons, the amount of liquid fuel in the fuel tank, and the lower series of numeral wheels 4, 5, 6, being arranged to register the total amount of liquid fuel consumed, said wheels 4, 5, 6, being designed to indicate respectively gallons, tens of gallons and hundredths of gallons. The series of numeral wheels 1, 2, 3, and 4, 5, 6, which are mounted on shafts 7, 8, supported in brackets 9, 10, on the casing C are connected by any of the well known forms of transfer mechanism, (not shown), the first of the sets of wheels 1, 4, being fixed to the shafts 7, 8, to rotate therewith, and the other numeral wheels 2, 3, and 5, 6, being loosely mounted on the shafts to rotate thereon. 11 designates the power shaft of the motor and motion is transmitted therefrom to the indicator device through a worm gear 12 on the power shaft 11 meshing with a gear 13 on one end of a shaft 14 supported for rotation in bearings 15 and having a pinion 16 fixed thereon at its other end meshing with a gear 17' that meshes with the gear 17 on the first wheel 1 of the upper series of numeral wheels. As will be understood the upper series of numeral wheels 1, 2, 3, rotate in both directions while the lower series of wheels rotate in one direction only. Motion is transmitted from the upper numeral wheel shaft 7 to the lower shaft 8 and the first of the lower series of numeral wheels 4 by a pawl 18 pivotally mounted on a disk 19 fixed on the upper shaft 7 and cooperating with a ratchet wheel 20, which latter and a gear 21 secured thereto are loosely mounted on the shaft 7. The gear 21 meshes with a pinion 22 fixed on a shaft 23 supported for rotation in bearings 24 and having fixed thereon a smaller gear 25 that meshes with a gear 26 fixed to the lower numeral wheel shaft 8. The gears 25 and 26 constitute a 1 -to 10 reduction gearing, the gear 25 having one-tenth as many teeth as the gear 26, so that when the upper shaft 7 is turned clockwise the numeral wheel 4 of the lower series of wheels will be moved clockwise one step or numeral for every revolution or turn of the upper numeral wheel 1. 27 designates a pawl engaging a ratchet wheel 27 fixed on the shaft 23 to prevent rotation of said shaft when the upper numeral wheel shaft 7 is rotated anti-clockwise.

The electric motor B, which is of relatively small size, may be of any of the well known type of reversible rotary electric motors suitable for the purpose. $b$ designates the armature of the motor, $b'$ the commutator brushes, and $b^2$, $b^3$, leads respectively to opposite windings of the motor field and providing for the operation of the armature in opposite directions.

Switch mechanism is provided for reversing and controlling the operation of the armature B to actuate the indicator device A in accordance with the amount of liquid fuel supplied to the liquid fuel tank and its consumption and passage therefrom, said switch mechanism comprising co-operating relatively movable switch members, one of said switch members being connected with a float in the fuel tank, and the other with motor B to be actuated thereby. Referring in detail to the controlling means Figures 6 to 10, 28 designates a liquid fuel tank of a motor vehicle located as usual at the rear of the vehicle. 20 and 30 are the members of the switch mechanism, said members in the particular construction shown, being movable rectilinearly. The switch member 29 consists of a rectangular shaped base or block of insulating material having on its upper face two rectangular shaped metal contact plates or strips $29^a$, $29^b$, of less width than the width of the base disposed longitudinally and centrally of the sides thereof in spaced relation, and having an insulating portion or strip $29^c$ between the adjacent ends of the contact plates $29^a$, $29^b$, with its upper face extending flush with the upper faces of the contact plates, said contact plates or strips $29^a$, $29^b$, and the insulating strip or portion $29^c$ being rigidly mounted on the base in any suitable way. The switch member 29 is slidably supported upon a plate 31 suitably secured to the top $28^a$ of the fuel tank, the switch member 29 being provided with longitudinal flanges $29^d$ slidably engaging beneath overhanging guide flanges 32 on said plate. The switch member 30 comprises a head or block of insulating material having mounted thereon a contact brush $30^a$, said switch member being movable longitudinally above the switch member 29, and its brush $30^a$ adapted to slidably engage the contact plates or strips $29^a$, $29^b$, and the intermediate insulating strip $29^c$, the insulating strip $29^c$ being of a width relative to the width of the contacting brush $30^a$ sufficient to provide an insulating area for the brush $30^a$ to rest upon out of contact with the contact plates or strips $29^a$, $29^b$.

33, 34 and 35 designate binding posts on the contact plates or strips $29^a$, $29^b$, and the brush $29^c$, which are respectively connected by conductors 36, 37, 38, to leads $b^2$, $b^3$, of the opposite windings of the motor field, and the commutator brush $b'$ of the motor B, the windings $b^4$, $b^5$, being connected with the other brush $b^6$ of the motor B. Said conductors 36, 37, and 38 having flexible portions providing for the movement of the switch members. 39 designates a storage battery or other suitable source of electric energy for operating the motor B, the same being interposed in the conductor 38.

The switch member 29 is connected with the motor B to be moved thereby in one direction through the medium of a flexible cable 40, preferably of wire, suitably secured at one end to one end of the base 29 and extending forwardly therefrom and secured at its other end to a rack 41 engaged by a pinion 42 on a shaft 43, which has fixed thereon a pinion 44 that meshes with a worm gear 45 on the counter shaft 23. The rack 41 is shown provided at one end with a slotted plate 46 adjustably secured thereto by screw pins 47 and to which the end of the cable 40 is secured to provide for adjusting the cable connection. The rack 41 is supported for sliding movement in a bearing 48 on an auxiliary casing part 49 at the rear of the casing C. The auxiliary casing part 49 is split as shown and has a clamp screw and nut 50—51 the same being adapted to be clamped over the rear end of the main casing C, as shown, providing for the disposition of the rack 41 at different angles. 52 designates a tubular guide for the cable 40 extending from the supporting plate 31 to the side of the auxiliary casing part 49. The forward portion 52$^a$ of the tubular guide 52 directly adjoining the auxiliary casing part 49 is rigidly secured to said casing part to extend in alignment with the bearing 48 for the rack 41. The other end of the tubular guide 52 is adjustably secured to the plate 31, said tubular guide having a threaded portion 52$^b$ extending through spaced apertured lugs 31$^a$ on the plate 31 and being clamped thereto by nuts 53. The tubular guide 52, which may be conveniently formed of metal tubing or other suitable material may be provided, at intervals along the same, for example at the bends 52$^c$ therein, with small sheaves 54 to support the cable 40. 55—56 designate coiled tension springs secured at opposite ends to the supporting plate 31 at 57, 58 and to lateral extensions 59 at one end of the base 29, said springs functioning to maintain the cable 40 taut and to move the switch member 29 backwardly when the motor B is operated in one direction.

The switch member 30 is mounted on one end of a horizontal arm or link 60 which is pivotally connected at one end to the upper end of a lever 61 working through a slot 62 in the top of the fuel tank 28 and plate 31 and pivoted intermediate its ends to a bracket 63 within the tank. The lever 61 has a curved tail portion 61$^a$ to cooperate with a cam 64 which is pivoted at 65 to the bracket 63 and has secured thereto a lever or arm 66 to which is secured a float 67. As will be understood upon the rise and fall of the float 67 motion will be transmitted through the cam 64 and lever 61 to the link 60 to move the contact brush of the switch member 30 along the switch member 29. A coiled tension spring 68 secured at opposite ends to the link 60 and lever 61 adjacent the pivotal connection of said link with said lever acts to exert a downward pressure upon the link 60 and yieldably maintain the brush 30$^a$ of the switch member 30 in contact with the switch member 29. 69 designates a coiled spring secured at one end to a bracket 70 and at its other end to the lever 61, said spring serving to maintain the lower end of the lever in engagement with the cam 64. The curved tail or end portion 61$^a$ of the lever 61 is provided with a part 71 to engage the face of the cam 64, both the part 71 and the cam 64 being preferably formed of glass, the float arm 66 being secured in an opening in the cam 64 by cement. 72 designates a cover member for the control means removably secured to the plate 31 by screws or equivalent securing means.

In Figure 7 of the drawings, the float and switch control mechanism is shown in the position of the parts when the fuel tank is about half filled with liquid fuel, the brush 30$^a$ of the switch member 30 resting upon the insulating strip 29$^c$ of the switch member 29 between the contact plates or strips 29$^a$—29$^b$, the electric circuit from the storage battery 39 to the motor B being broken and the motor at rest. In the operation of the mechanism upon movement of the float 66 in following the rise and fall of the liquid fuel in the tank 28, the switch member 30 will be moved longitudinally of the switch member 29, the brush 30$^a$ will be moved off of the insulating strip 29$^c$ into contact with one of the contacting plates or strips 29$^a$—29$^b$, the motor circuit, through one of its windings, will be closed and the motor operated to actuate the indicator device C in one direction or the other depending upon whether the float rises or falls. If the float rises, the switch member 30 will be moved to the right, the brush 30$^a$ being moved on to the contact plate 29$^b$, and the motor will be operated to turn the indicator device clockwise. As the motor operates, motion will be transmitted to the rack 41 and cable 40 through the worm gear 45 on the counter shaft 23 and gear 44—45, and the switch member 29 will be moved to the right until its insulating strip 29$^c$ is brought beneath the brush 30$^a$ of the switch member 30 when the circuit is broken and the motor stopped. If the float 66 lowers, the switch member 30 will be moved to the left, the brush 30$^a$ being moved onto the contact plate 29$^a$ of the switch 29 closing the circuit through the other winding of the motor B, which is thus reversed to operate the indicator device C in the opposite direction to turn back its number wheels. Upon the operation of the motor B anti-clockwise the rack 40 is moved to the left, and upon this movement of the rack, the springs 55—56 move the switch member 29 to the left. As soon as the insulating strip 29$^c$ of the switch member 29 is moved beneath the brush 30$^a$ of the switch member 30 the circuit is again broken and the operation ceases. As will be understood the mechanism can be readily applied for use with fuel tanks of different shapes through the appropriate change of the pitch or curvature of the face of the cam 66 and the size of the gear pinion 42.

It will be noted that the particular construction and arrangement of parts hereinbefore set forth affords indicating mechanism of a simple compact nature capable of being applied to various makes of motor vehicles, providing for the operation of the indicator at a distance from the fuel tank on the vehicle instrument board, and that will be reliable and efficient in use.

What I claim is:

1. The combination with a fuel tank of indicator mechanism including a float in the tank, an indicator device rotatable in opposite directions, a reversible rotary electric motor for operating the indicator device, and automatic switch mechanism for reversing and controlling the operation of the motor, said switch mechanism including co-operating switch members movable rectilinearly relatively to each other, one of said switch members being connected with the float to be actuated thereby, and a connection between the other switch member and the motor providing for moving said switch member in one direction, said connection including a rack and pinion and a flexible cable connection between the rack and said switch member, and resilient means for moving said switch member in the opposite direction.

2. The combination with a fuel tank of indicator mechanism including a float in the tank, an indicator device rotatable in opposite directions, a reversible rotary electric motor for operating the indicator device, and automatic switch mechanism for reversing and controlling the operation of the motor, said switch mechanism including cooperating relatively movable switch members connected respectively with the float and the motor to be actuated thereby, one of said switch members comprising a supporting base supported for movement rectilinearly and two contact plates mounted on said base, said contact plates being disposed longitudinally of the base and spaced at their adjoining ends from each other, and the other switch member comprising a brush adapted to be moved longitudinally of said contact plates and slidably engage the same.

3. The combination with a fuel tank of indicator mechanism including a float in the tank, an indicator device rotatable in opposite directions, a reversible rotary electric motor for operating the indicator device, and automatic switch mechanism for reversing and controlling the operation of the motor, said switch mechanism including cooperating relatively movable switch members connected respectively with the float and the motor to be actuated thereby, one of said switch members comprising a supporting base supported for movement rectilinearly, two contact plates mounted on said base, said contact plates being disposed longitudinally of the base and spaced at their adjoining ends from each other, and a strip of insulation on said base interposed between the adjacent ends of the contact plates, and the other switch member comprising a brush adapted to be moved longitudinally of said contact plates and to slidably engage the same.

4. The combination with a fuel tank of indicator mechanism including a float in the tank, an indicator device rotatable in opposite directions, a reversible rotary electric motor for operating the indicator device and automatic switch mechanism for reversing and controlling the operation of the motor, said switch mechanism including cooperating relatively movable switch members, one of said switch members being operatively connected with the float, and a connection between the other switch member and the motor providing for moving said switch member in one direction, said connection including a rack and pinion, and a flexible cable connection between the rack and said switch member, and spring means for moving said switch member in the opposite direction.

5. The combination with a fuel tank of indicator mechanism including a float in the tank, an indicator device rotatable in opposite directions, a reversible rotary electric motor for operating the indicator device, and automatic switch mechanism for reversing and controlling the operation of the motor, said switch mechanism including a supporting plate provided with spaced parallel guide flanges thereon, cooperating relatively movable switch members, one of said switch members comprising a supporting base having contacts thereon and mounted for sliding movement on said plate between the guide flanges thereon, a connection between said base and motor providing for moving said base in one direction, said connection including a rack and pinion, and a flexible cable connection between the rack and said base, and tension springs disposed at either side of said switch member, said springs being secured at one end to one end portion of said base and at their other ends to said supporting plate to exert pressure upon the base in the opposite direction, and the other switch member comprising a brush operatively connected with the float to be moved longitudinally thereby and adapted to slidably engage the contacts of said first mentioned switch member.

6. The combination with a fuel tank of indicator mechanism including a float in the tank, an indicator device rotatable in opposite directions, a reversible rotary electric motor for operating the indicator device, and automatic switch mechanism for reversing and controlling the operation of the motor, said switch mechanism including cooperating relatively movable switch members, one of said switch members comprising a supporting base supported to slide rectilinearly and having separate contact plates thereon, said member being connected with the motor to be actuated thereby, and the other switch member comprising a brush movable longitudinally above said base and adapted to slidably engage said contact plates, and a connection between said brush and the float comprising a vertically swinging lever connected at one end to the float to be actuated thereby and having a cam at its other end, a second lever pivoted intermediate its ends, one end of said second lever engaging said cam, a horizontally disposed link member pivotally connected at one end to the other end of said second lever and carrying said brush at its free end.

7. The combination with a fuel tank of indicator mechanism including a float in the tank, an indicator device rotatable in opposite directions, a reversible rotary electric motor for operating the indicator device, and automatic switch mechanism for reversing and controlling the operation of the motor, said switch mechanism including cooperating relatively movable switch members, one of said switch members comprising a supporting base supported to slide rectilinearly and having separate contact plates thereon, said switch member being connected with the motor to be actuated thereby, and the other switch member comprising a brush movable longitudinally above said base and adapted to slidably engage said contact plates, and a connection between said brush and the float comprising a vertically swinging lever connected at one end to the float to be actuated thereby and having a cam at its other end, a second lever pivoted intermediate its ends, one end of said second lever engaging said cam, a horizontally disposed link member pivotally connected at one end to the other end of said second lever and carrying said brush at its free end, and resilient means for pressing the outer end of the link downwardly to maintain said brush in operative relation with the other switch member.

8. The combination with a fuel tank of indicator mechanism including a float in the tank, an indicator device rotatable in opposite directions, a reversible rotary electric motor for operating the indicator device, and automatic switch mechanism for reversing and controlling the operation of the motor, said switch mechanism including cooperating relatively movable switch members, one of said switch members comprising a supporting base supported to slide rectilinearly and having separate contact plates thereon, said switch member being connected with the motor to be actuated thereby, and the other switch member comprising a brush movable longitudinally above said base and adapted to slidably engage said contact plates, and a connection between said brush and the float comprising a vertically swinging lever connected at one end to the float to be actuated thereby and having a cam at its other end, a second lever pivoted intermediate its ends, one end of said second lever engaging said cam, a horizontally disposed link member pivotally connected at one end to the other end of said second lever and carrying said brush at its free end, and a spring member connected with said second lever and said link and acting to press the outer end of the link with said brush toward the other switch member.

9. The combination with a fuel tank of indicator mechanism including a float in the tank, an indicator device rotatable in opposite directions, a reversible rotary electric motor for operating the indicator device, and automatic switch mechanism for reversing and controlling the operation of the motor, said switch mechanism including cooperating relatively movable switch members, one of said switch members comprising a supporting base supported to slide rectilinearly and having separate contact plates thereon, said switch member being connected with the motor to be actuated thereby, the other switch member comprising a brush movable longitudinally above said base and adapted to slidably engage said contact plates and a connection between said brush and the float comprising a vertically swinging lever connected at one end to the float to be actuated thereby and having a cam at its other end, a second lever pivoted intermediate its ends, one end of said second lever engaging said cam, a horizontally disposed link member pivotally connected at one end to the other end of said second lever and carrying said brush at its free end, and a coiled tension spring connected at opposite ends respectively with said link and the adjoining end portion of said second lever, said spring acting to maintain the brush in operative relation with the other switch member.

10. The combination with a motor vehicle having a fuel tank supported at the rear thereof and an instrument board at the front thereof, indicator mechanism including a float in the fuel tank, an indicator device rotatable in opposite directions, a reversible electric motor for operating the indicator device, said indicator device and motor being mounted on the instrument board, and automatic switch mechanism for reversing and controlling the operation of the motor, said switch mechanism including cooperating switch members movable rectilinearly relatively to each other, said switch members being supported adjacent the fuel tank, one of the switch members being connected with the float to be actuated thereby, and an operative connection between the other switch member and the motor including a rack and pinion, the rack being disposed transversely adjacent the instrument board, and a flexible cable connection between said rack and said switch member, and spring means for moving the said switch member in the opposite direction.

In testimony whereof I hereunto affix my signature.

LOUIS A. WHITE.